US007028822B2

(12) United States Patent
Rush

(10) Patent No.: US 7,028,822 B2
(45) Date of Patent: Apr. 18, 2006

(54) INTEGRATED ACTUATOR ASSEMBLY

(75) Inventor: Robert W. Rush, Put-in-Bay, OH (US)

(73) Assignee: North American Clutch Corporation, Milwaukee, WI (US)

( * ) Notice: Subject to any disclaimer, the term of this patent is extended or adjusted under 35 U.S.C. 154(b) by 0 days.

(21) Appl. No.: 10/640,203

(22) Filed: Aug. 13, 2003

(65) Prior Publication Data

US 2005/0034954 A1    Feb. 17, 2005

(51) Int. Cl.
*F16D 67/04* (2006.01)
(52) U.S. Cl. ........................................ 192/16; 192/12 C
(58) Field of Classification Search .............. 192/12 R, 192/12 C, 14, 15, 16, 18 A
See application file for complete search history.

(56) References Cited

U.S. PATENT DOCUMENTS

| 2,440,850 | A | * | 5/1948 | Dilworth .................... 415/123 |
| 3,309,852 | A | | 3/1967 | Allen |
| 3,566,587 | A | | 3/1971 | Janssen |
| 3,568,420 | A | | 3/1971 | Hofer et al. |
| 3,757,596 | A | | 9/1973 | McCanse |
| 3,800,612 | A | | 4/1974 | Fulghum |
| 3,974,890 | A | | 8/1976 | Noble |
| 4,669,361 | A | | 6/1987 | Ito et al. |

(Continued)

FOREIGN PATENT DOCUMENTS

CH         438956         6/1967

(Continued)

OTHER PUBLICATIONS

European Search Report dated Nov. 9, 2004, cited in European Patent Application No. 03014752.4.

*Primary Examiner*—Saul Rodriguez
(74) *Attorney, Agent, or Firm*—Michael Best & Friedrich LLP

(57) ABSTRACT

An actuator assembly adapted to selectively cause an input disk of a clutch/brake assembly to engage an output disk of a clutch/brake assembly. The actuator assembly includes a movable piston integrated with the clutch/brake assembly. At least a portion of the clutch/brake assembly defines an expansible chamber in combination with the piston. The piston is movable in the clutch/brake assembly to selectively cause the input disk to engage the output disk. The actuator assembly also includes a housing positioned remotely from the clutch/brake assembly, and a fluid compressor located within the housing. The fluid compressor is operable to generate a fluid pressure and provide the fluid pressure to the expansible chamber to move the piston.

18 Claims, 2 Drawing Sheets

U.S. PATENT DOCUMENTS

| | | | |
|---|---|---|---|
| 4,860,862 A * | 8/1989 | Yater et al. ............... 192/18 A |
| 4,951,462 A | 8/1990 | Graf |
| 5,257,684 A * | 11/1993 | Collins ..................... 192/18 A |
| 5,433,066 A | 7/1995 | Wenzel et al. |
| 5,540,558 A | 7/1996 | Harden et al. |
| 5,570,765 A | 11/1996 | Patridge |
| 5,651,436 A * | 7/1997 | Sommer .................. 192/12 C |
| 5,802,850 A | 9/1998 | Kimura |
| 5,865,020 A | 2/1999 | Busboom et al. |
| 5,911,672 A | 6/1999 | Schaedler et al. |
| 5,918,449 A | 7/1999 | Rush et al. |
| 5,937,979 A * | 8/1999 | Cummings ............... 192/18 A |
| 5,939,803 A | 8/1999 | Frost |
| 6,230,608 B1 | 5/2001 | Schaedler et al. |
| 6,347,502 B1 | 2/2002 | deVries |
| 6,543,560 B1 | 4/2003 | Trefz et al. |
| 6,705,624 B1 | 3/2004 | Cassoni |
| 2004/0089145 A1 * | 5/2004 | Rush ........................ 91/459 |

FOREIGN PATENT DOCUMENTS

| | | |
|---|---|---|
| DE | 2708177 | 8/1978 |
| EP | 0 531 247 A1 | 3/1993 |
| JP | 07327458 | 12/1995 |

* cited by examiner

INTEGRATED ACTUATOR ASSEMBLY

FIELD OF THE INVENTION

This invention relates generally to actuator assemblies, and more particularly to actuator assemblies for use to operate clutch/brake assemblies.

BACKGROUND OF THE INVENTION

Some conventional actuator assemblies may comprise a variation of a housing containing a movable piston with an attached rod. The rod usually extends outside of the housing and attaches to the object being actuated. A separate, remotely located power source is typically fluidly connected to the housing to provide a compressed fluid to the housing to move the piston and the rod. Conduit or hose is typically utilized to provide the fluid connection between the power source and the housing. Such a conventional actuator assembly may include a hydraulic or pneumatic cylinder, in combination with a hydraulic pump or an air pump, respectively.

Such conventional actuator assemblies may be configured, sometimes in combination with additional structure, to push or pull an object, tilt an object, open and close an object, clamp and/or grip an object, and/or raise and lower an object.

SUMMARY OF THE INVENTION

The present invention provides, in one aspect, an actuator assembly adapted to selectively cause an input disk of a clutch/brake assembly to engage an output disk of a clutch/brake assembly. The actuator assembly includes a movable piston integrated with the clutch/brake assembly. At least a portion of the clutch/brake assembly defines an expansible chamber in combination with the piston. The piston is movable in the clutch/brake assembly to selectively cause the input disk to engage the output disk. The actuator assembly also includes a housing positioned remotely from the clutch/brake assembly, and a fluid compressor located within the housing. The fluid compressor is operable to generate a fluid pressure and provide the fluid pressure to the expansible chamber to move the piston and operate the clutch/brake assembly.

The present invention provides, in another aspect, an actuator system including a housing and a clutch/brake assembly positioned remotely from the housing. The clutch/brake assembly includes an input disk, an output disk, and a movable piston. At least a portion of the clutch/brake assembly defines an expansible chamber in combination with the piston. The piston is movable to selectively cause the input disk to engage the output disk. The actuator system also includes a fluid compressor located within the housing. The fluid compressor is fluidly connected to the expansible chamber to generate a fluid pressure within the expansible chamber to move the piston.

The present invention provides, in yet another aspect, an actuator system including a housing having a passageway. The passageway allows movement of fluid between inside and outside of the housing. The actuator system also includes a fluid filter fluidly connected with the passageway such that fluid moving between inside and outside of the housing passes through the fluid filter. Further, the actuator system includes a clutch/brake assembly positioned remotely from the housing. The clutch/brake assembly includes an input disk, an output disk, and a movable piston. At least a portion of the clutch/brake assembly defines an expansible chamber in combination with the piston. The piston is movable to selectively cause the input disk to engage the output disk. The actuator system also includes a fluid compressor located within the housing. The fluid compressor is fluidly connected to the expansible chamber via a conduit to generate a fluid pressure within the expansible chamber to move the piston. Further, the actuator system includes a valve selectively fluidly connectable with the expansible chamber and the housing to selectively vent fluid pressure from the expansible chamber to the housing, and a pressure switch fluidly connected with the expansible chamber to detect a level of fluid pressure in the expansible chamber.

Other features and aspects of the present invention will become apparent to those skilled in the art upon review of the following detailed description, claims and drawings.

BRIEF DESCRIPTION OF THE DRAWINGS

In the drawings, wherein like reference numerals indicate like parts.

Figure 1:
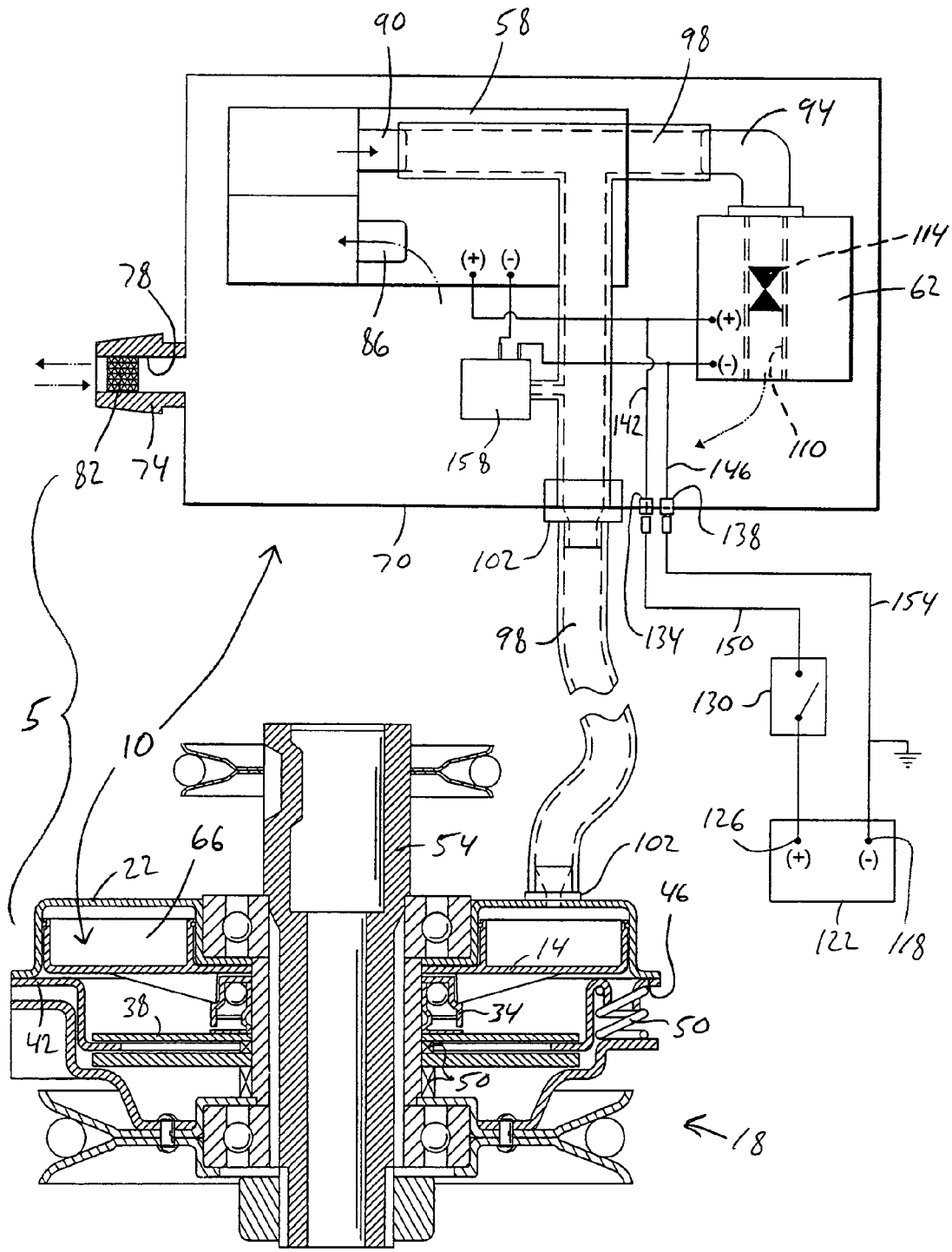
FIG. 1 is a schematic view of an actuator system including an actuator assembly integrated with a clutch/brake assembly, illustrating the clutch/brake assembly in a braking position.

Before any features of the invention are explained in detail, it is to be understood that the invention is not limited in its application to the details of construction and the arrangements of components set forth in the following description or illustrated in the drawings. The invention is capable of other constructions and of being practiced or of being carried out in various ways. Also, it is to be understood that the phraseology and terminology used herein is for the purpose of description and should not be regarded as limited.

DETAILED DESCRIPTION

As shown schematically in FIG. 1, an actuator system 5 of the present invention includes an actuator assembly 10 partially integrated with a clutch/brake assembly 18. More particularly, the actuator assembly 10 includes a movable piston 14 integrated with the clutch/brake assembly 18. Such a clutch/brake assembly 18 is shown and the operation of which is described in U.S. patent application Ser. No. 10/356,963, filed on Feb. 3, 2002, the entire contents of which is incorporated herein by reference. In the illustrated construction, the piston 14 is substantially annular in shape and is positioned in an upper housing portion 22 of the clutch/brake assembly 18 for sliding movement relative to the upper housing portion 22. However, in other constructions of the actuator assembly (not shown), the piston may be shaped accordingly to be used with clutch/brake assembly designs different than that shown in FIG. 1.

Figure 2:
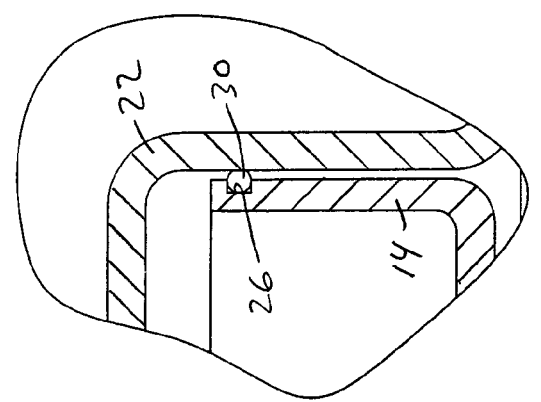
FIG. 2 is an enlarged view of a portion of the clutch/brake assembly.

Referring briefly to FIG. 2, multiple grooves 26 are formed in the piston 14 to fit multiple seals 30 therein. The seals 30 substantially seal the space formed between the upper housing portion 22 and the piston 14. In the illustrated construction, the seals 30 are shown in the form of conventional O-rings. However, in other constructions of the actuator assembly (not shown), the seals 30 may be conventional lip seals, among other types of seals. The piston 14 may be made of a material consistent with the materials used in other components of the clutch/brake assembly 18. Referring again to FIG. 1, in the illustrated construction, the piston 14 may be made of a similar metal as the upper housing portion 22 of the clutch/brake assembly 18.

Figure 3:
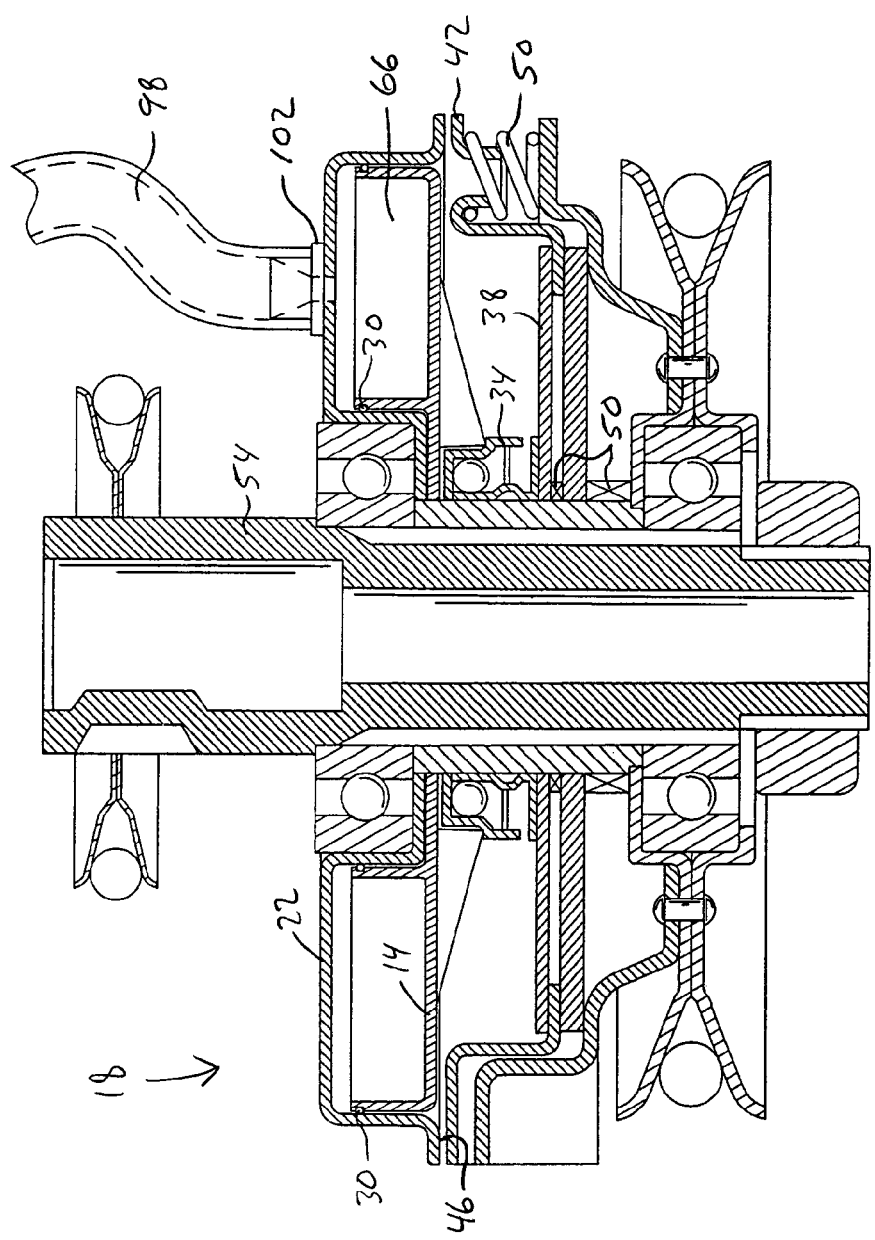
FIG. 3 is an enlarged view of the clutch/brake assembly, illustrating the clutch/brake assembly in a driving position.

In the illustrated construction, downward movement of the piston 14 (i.e., the piston 14 extending away from the upper housing portion 22) causes a thrust bearing 34 to act downwardly against an input disk 38, which in turn engages an output disk 42. At the same time, the output disk 42 is moved away from a braking surface 46 on the upper housing portion 22. The piston 14 is acting against multiple springs 50 positioned in the clutch/brake assembly 18 that resiliently bias the output disk 42 toward the braking surface 46 of the upper housing portion 22 and the input disk 38 away from the output disk 42 (see FIG. 3). During rotation of an input shaft 54 of the clutch/brake assembly 18, the co-rotating input disk 38 imparts rotation to the output disk 42 only upon engagement of the input disk 38 and output disk 42.

Looking now at a reversal in direction, upward movement of the piston 14 (i.e., the piston 14 retracting into the upper housing portion 22) allows the springs 50 to bias the output disk 42 toward the braking surface 46 of the upper housing portion 22 to stop rotation of the output disk 42. Also, the springs 50 bias the input disk 38 away from the output disk 42 to de-couple the rotation of the input disk 38 from the output disk 42.

The actuator assembly 10 also includes a fluid compressor 58 and a solenoid valve 62 to selectively provide pressurized fluid to an expansible chamber 66 defined by the space between the upper housing portion 22 and the piston 14. In the illustrated construction of the actuator assembly 10, the fluid compressor 58 provides compressed air to the expansible chamber 66, however, the compressor 58 may be configured to provide any of a number of compressed fluids or gasses to the expansible chamber 66. The compressor 58 is operable to provide a volumetric flow of, for example, 3 liters per minute of pressurized air at 10 psi pressure. Such a compressor 58, in addition to the solenoid valve 62, may be manufactured by the Chinese company Wanxsiang.

As shown schematically in FIG. 1, the compressor 58 and solenoid valve 62, among other components, are enclosed within a housing 70. The housing 70 is substantially sealed from its surrounding environment, with the exception of a breather port 74 coupled to the housing 70. The breather port 74 includes a passageway 78 formed therein for allowing movement of air between inside and outside of the housing 70. A filter 82 is positioned in the passageway 78 such that the air moving between inside and outside the housing 70 must pass through the filter 82. The filter 82 may comprise any of a number of conventional filter materials, including a wire screen, organic and/or synthetic fibers, a polymeric gas-permeable membrane, and so forth. The housing 70 is made of a petroleum-resistant and dimensionally stable plastic, such as 10% glass filled polypropylene. Alternatively, other plastics having these characteristics may be used, and different types and amounts of fillers other than glass fiber may be used. Also, the housing 70 may be made of metal by such methods including, among others, die casting.

The compressor 58 includes an inlet port 86 and an outlet port 90, whereby air (or other gas) is drawn through the breather port 74, into the housing 70, through the inlet port 86 of the compressor 58, compressed to an elevated pressure, and discharged through the outlet port 90 of the compressor 58. The compressor outlet port 90 is fluidly connected to an inlet port 94 of the solenoid valve 62 via a conduit 98. The conduit 98 also fluidly connects the outlet port 90 of the compressor 58 with the expansible chamber 66 via bulkhead fittings 102 and additional conduit 98. The conduit 98 may include separate pieces of rubber tubing, plastic tubing, or any equivalent thereof. Alternatively, portions of the conduit 98 or the entire conduit 98 may be integrally formed with the housing 70.

In the illustrated construction of the actuator assembly 10, the solenoid valve 62 is configured as a conventional two port, two position solenoid valve 62. The solenoid valve 62 is biased toward an open position, in which the inlet port 94 is fluidly connected with an outlet port 110 of the solenoid valve 62 by an internal valve 114 within the solenoid valve 62. The outlet port 110, in turn, is open to the interior of the housing 70. Upon being energized, the solenoid valve 62 moves toward a closed position, in which the inlet port 94 is fluidly disconnected from the outlet port 110.

As shown schematically in FIG. 1, the actuator system 5 may be carried by a vehicle (not shown), such as a lawn-mower or a lawn tractor. The clutch/brake assembly 18 having the integrated piston 14 may be positioned in the vicinity of a mower deck of the lawn tractor, while the housing 70 may be positioned remotely from the mower deck and coupled to the clutch/brake assembly 18 via the conduit 98. The solenoid valve 62 and compressor 58 are electrically grounded to the vehicle chassis, along with a negative terminal 118 of a battery 122. Alternatively, the solenoid valve 62 and compressor 58 may be electrically grounded directly to the battery 122. A positive terminal 126 of the battery 122 is electrically connected to the solenoid valve 62 through a normally-open PTO switch 130. The PTO switch 130 can be any of a variety of user-manipulated switches including push-buttons, toggle switches, knobs, levers, and so forth. As shown schematically in FIG. 1, multiple conductive terminals 134, 138 are coupled to the housing 70 to electrically connect respective positive and negative wire leads 142, 146 inside the housing 70 with respective positive and negative wire leads 150, 154 outside of the housing 70.

The positive terminal 126 of the battery 122 is electrically connected to the compressor 58 through the normally-open PTO switch 130 and a normally-closed pressure switch 158. As shown schematically in FIG. 1, the pressure switch 158 is spliced downstream of the PTO switch 130 such that when the PTO switch 130 is closed, voltage is provided to the normally-closed pressure switch 158. Subsequently, if the pressure switch 158 is closed, voltage is provided to the compressor 58. The pressure switch 158 is fluidly connected with the expansible chamber 66 via the conduit 98 to detect the level of the fluid pressure within the expansible chamber 66. The pressure switch 158 may be configured such that the switch 158 remains closed below a pre-determined fluid pressure level in the expansible chamber 66, while a fluid pressure level greater than the pre-determined fluid pressure level causes the switch 158 to open and remove the voltage to the compressor 58.

Alternatively, a limit switch (not shown) may be mounted inside the expansible chamber 66 in close proximity to the piston 14, such that selective movement of the piston 14 triggers the limit switch to open or close the electrical circuit between the battery 122 and the compressor 58 (depending on the configuration of the electrical circuit). As a further alternative, any combination of electrical components and wiring that yields the same result may be used. Also, any number of safety switches (e.g., a seat switch and a transaxle switch), relays, and/or other electrical components (not shown) may be included in the electrical circuit schematically illustrated in FIG. 1.

To activate the actuator assembly 10 from a deactivated state, in which the piston 14 is fully retracted into the upper housing portion 22 (see FIG. 1), the PTO switch 130 is first closed to energize the solenoid valve 62 and the compressor 58. Upon energizing the solenoid valve 62, the inlet port 94 is fluidly disconnected from the outlet port 110. The compressor 58 then draws air through the breather port 74 and the compressor inlet port 86, pumps the air through the conduit 98 and into the expansible chamber 66 via the bulkhead fittings 102 and conduit 98. Since the solenoid valve 62 is energized, the solenoid valve 62 is maintained in a closed position, thereby providing a "plug" to the pressurized air in the conduit 98 and the expansible chamber 66. As the expansible chamber 66 fills with air, the air pressure forces the piston 14 to move axially inside the upper housing portion 22 and extend from the upper housing portion 22 (see FIG. 3), thereby causing the input disk 38 and the output disk 42 of the clutch/brake assembly 18 to drivingly engage. Upon reaching a pre-determined fluid pressure level in the expansible chamber 66, the pressure switch 158 is caused to trigger such that the electrical circuit between the battery 122 and compressor 58 is opened, therefore de-energizing the compressor 58. The pre-determined fluid pressure level may be calibrated with a desired stroke of the piston 14.

The pressure is maintained within the conduit 98 and expansible chamber 66 to maintain the piston 14 in an extended position. If air leaks from the system (i.e. from the compressor 58, the solenoid valve 62, the conduit 98, or the expansible chamber 66), pressure equalization between opposite sides of the piston 14, in addition to other restoring forces acting on the piston 14 (e.g., by springs 50, or other resilient members in the clutch/brake assembly), may cause the piston 14 to retract back into the upper housing portion 22. As a result, the fluid pressure level detected by the pressure switch 158 may trigger the switch 158 closed, therefore closing the electrical circuit between the battery 122 and compressor 58, and re-energizing the compressor 58. The compressor 58 pumps air through the conduit 98 and into the expansible chamber 66 until the amount of leaked air is replaced and the fluid pressure level returns to the pre-determined level, at which time the pressure switch 158 opens to de-energize the compressor 58.

To de-activate the actuator assembly 10 from an activated state, in which the piston 14 is fully extended from the upper housing portion 22, the PTO switch 130 is opened, therefore de-energizing the compressor 58 and solenoid valve 62. As a result, the pressurized air in the expansible chamber 66 and conduit 98 is vented to the interior of the housing 70 through the outlet port 110 of the solenoid valve 62. Further, the pressurized air may vent outside the housing 70 via the breather port 74. As a result of the bi-directional movement of air through the filter 82, the filter 82 is maintained substantially cleared from debris entrained in the air. Finally, pressure equalization between opposite sides of the piston 14, in addition to other restoring forces acting on the piston 14 (e.g., by springs 50, or other resilient members in the clutch/brake assembly 18), causes the piston 14 to retract back into the upper housing portion 22. As a result, the input disk 38 and output disk 42 are allowed to disengage, and the output disk 42 is biased back toward the braking surface 46 of the upper housing portion 22.

I claim:
1. An actuator assembly adapted to selectively cause an input disk of a clutch/brake assembly to engage an output disk of a clutch/brake assembly, the actuator assembly comprising:
   a movable piston integrated with the clutch/brake assembly, at least a portion of the clutch/brake assembly defining an expansible chamber in combination with the piston, the piston being movable in the clutch/brake assembly to selectively cause the input disk to engage the output disk;
   a housing positioned remotely from the clutch/brake assembly;
   a fluid compressor located within the housing, the fluid compressor being operable to generate a fluid pressure and provide the fluid pressure to the expansible chamber to move the piston; and
   a pressure switch fluidly connected with the expansible chamber to detect a level of the fluid pressure wherein the pressure switch is selectively triggered by the level of the fluid pressure, and wherein the pressure switch selectively electrically connects the fluid compressor and a power source to operate the compressor.

2. The actuator assembly of claim 1, wherein the housing includes a passageway therethrough, the passageway allowing movement of fluid between inside and outside of the housing.

3. The actuator assembly of claim 2, further comprising a fluid filter fluidly connected with the passageway such that fluid moving between inside and outside of the housing passes through the fluid filter.

4. The actuator assembly of claim 1, further comprising a conduit fluidly connecting the fluid compressor and the expansible chamber.

5. The actuator assembly of claim 1, further comprising a valve fluidly connected with the fluid compressor and the expansible chamber.

6. The actuator assembly of claim 5, wherein the valve selectively fluidly connects the expansible chamber and the housing to vent fluid pressure from the expansible chamber to the housing.

7. The actuator assembly of claim 5, wherein the valve is a solenoid valve, and wherein the solenoid valve is selectively electrically connected to a power source by a switch.

8. The actuator assembly of claim 1, further comprising a normally-open switch electrically connecting the fluid compressor and the power source to operate the compressor.

9. The actuator system of claim 1, wherein the fluid compressor is fluidly connected to the expansible chamber via a conduit.

10. The actuator system of claim 1, further comprising a valve fluidly connected with the fluid compressor and the expansible chamber.

11. The actuator system of claim 10, wherein the valve selectively fluidly connects the expansible chamber and the housing to vent fluid pressure from the expansible chamber to the housing.

12. The actuator system of claim 10, wherein the valve is a solenoid valve, and wherein the solenoid valve is selectively electrically connected to a power source via a switch.

13. An actuator system comprising:
   a housing including a passageway therethrough, the passageway allowing movement of fluid between inside and outside of the housing;
   a fluid filter fluidly connected with the passageway such that fluid moving between inside and outside of the housing passes through the fluid filter;

a clutch/brake assembly positioned remotely from the housing, the clutch/brake assembly including
an input disk,
an output disk, and
a movable piston, at least a portion of the clutch/brake assembly defining an expansible chamber in combination with the piston, the piston being movable to selectively cause the input disk to engage the output disk;
a fluid compressor located within the housing, the fluid compressor being fluidly connected to the expansible chamber via a conduit to generate a fluid pressure within the expansible chamber to move the piston;
a valve selectively fluidly connectable with the expansible chamber and the housing to selectively vent fluid pressure from the expansible chamber to the housing, wherein when pressure is vented from the expansible chamber the piston is movable to disengage the input disk and the output disk; and
a pressure switch fluidly connected with the expansible chamber to detect a level of the fluid pressure in the expansible chamber wherein the pressure switch is selectively triggered by the level of the fluid pressure, and wherein the pressure switch selectively electrically connects the fluid compressor and a power source to operate the fluid compressor.

14. The actuator system of claim 13 wherein the valve is a solenoid valve.

15. The actuator system of claim 13, and further comprising a normally-open switch selectively electrically connecting the valve to the power source and electrically connecting the fluid compressor and the power source to operate the fluid compressor.

16. An actuator system comprising:
a housing;
a clutch/brake assembly positioned remotely from the housing, the clutch/brake assembly including
an input disk,
an output disk, and
a movable piston, at least a portion of the clutch/brake assembly defining an expansible chamber in combination with the piston, the piston being movable to selectively cause the input disk to engage the output disk;
a fluid compressor located within the housing, the fluid compressor being fluidly connected to the expansible chamber to generate a fluid pressure within the expansible chamber to move the piston; and
a pressure switch fluidly connected with the expansible chamber to detect a level of the fluid pressure in the expansible chamber wherein the pressure switch is selectively triggered by the level of the fluid pressure, and wherein the pressure switch selectively electrically connects the fluid compressor and a power source to operate the compressor.

17. The actuator system of claim 16, wherein the housing includes a passageway therethrough, the passageway allowing movement of fluid between inside and outside of the housing.

18. The actuator system of claim 17, further comprising a fluid filter fluidly connected with the passageway such that fluid moving between inside and outside of the housing passes through the fluid filter.

* * * * *